United States Patent [19]

Eigenmann

[11] 4,072,403
[45] Feb. 7, 1978

[54] RETRO-REFLECTING ASSEMBLY

[76] Inventor: Ludwig Eigenmann, Vacallo, Switzerland

[21] Appl. No.: 705,596

[22] Filed: July 15, 1976

[30] Foreign Application Priority Data

July 16, 1975 Italy .................................. 25456/75
June 6, 1976 Italy .................................. 24096/76
July 6, 1976 Italy .................................. 25067/76

[51] Int. Cl.² ............................................ G02B 5/128
[52] U.S. Cl. ..................................... 350/105; 350/97; 404/6
[58] Field of Search ................................. 350/97–105, 350/109; 404/9, 12, 14

[56] References Cited

U.S. PATENT DOCUMENTS

| 1,872,643 | 8/1932 | Bone | 350/104 |
| 3,781,083 | 12/1973 | Eigenmann | 350/109 |
| 3,894,791 | 7/1975 | Eigenmann | 350/105 |
| 3,964,820 | 6/1976 | Eigenmann | 350/102 |

Primary Examiner—John K. Corbin
Assistant Examiner—B. W. delos Reyes
Attorney, Agent, or Firm—Michael J. Striker

[57] ABSTRACT

A new method for producing retro-reflecting assemblies of the type comprising a transparent globule having an essentially part-spherical upper portion uncoated for light impingement, and a lower portion associated to a monolayer of focusing and reflective microspheres, the method comprising forming said globule by subjecting a sheet thermoplastic material to heat and pressure in the bite of counter-rotating forming rollers to provide an essentially planar intermediate product having oppositely located bulges at either faces thereof, the globules being obtained by subdividing said product in parts each comprising a pair of opposite bulges. The invention comprises improved assemblies comprising each an asymmetrical globule having the monolayer of microspheres associated to its essentially bottom face and to its peripheral toroidal side face of radius of curvature smaller than that of its upper bulging portion exposed for light impingement.

6 Claims, 13 Drawing Figures

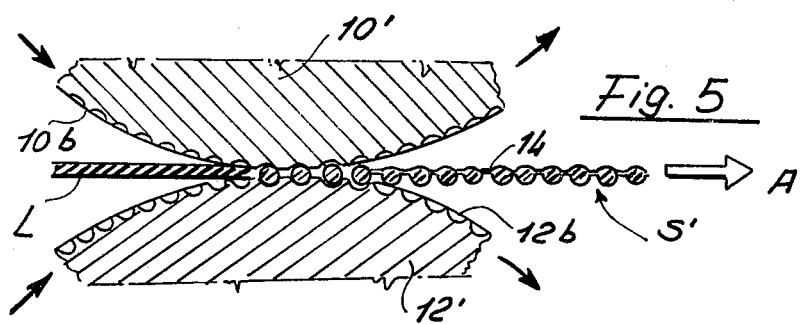
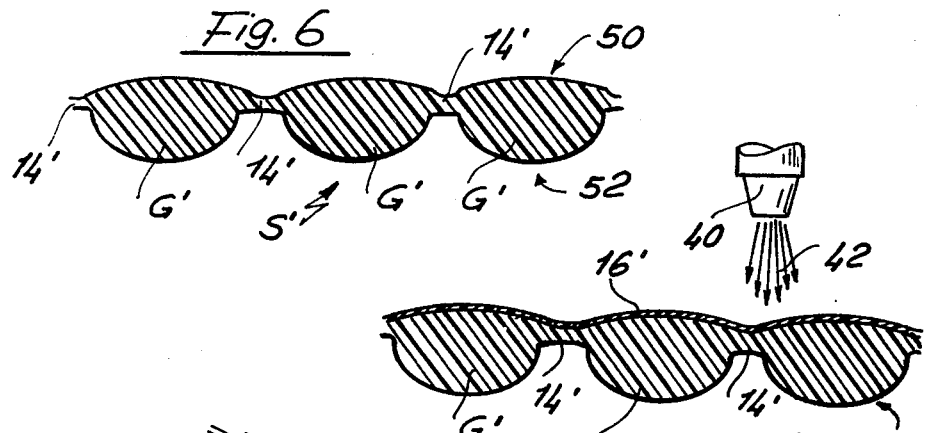
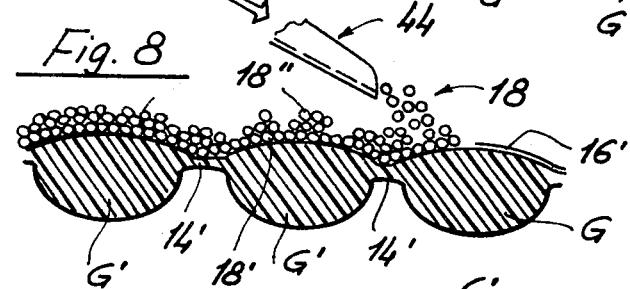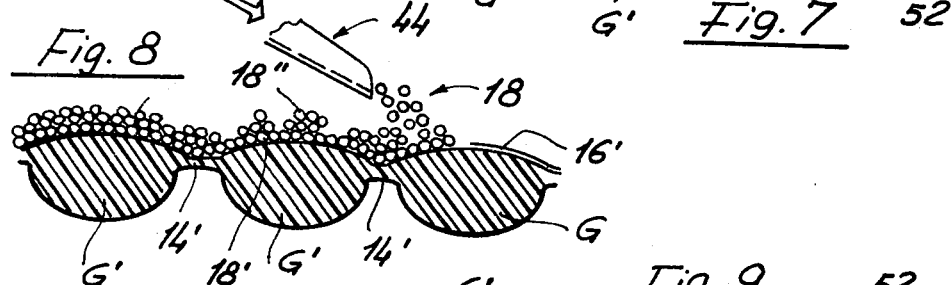
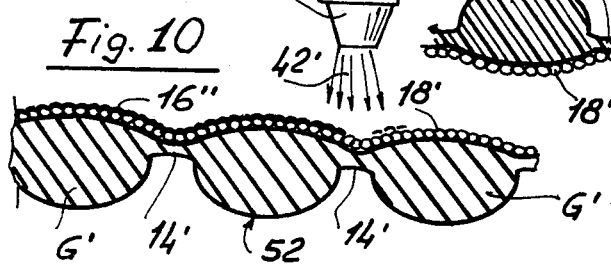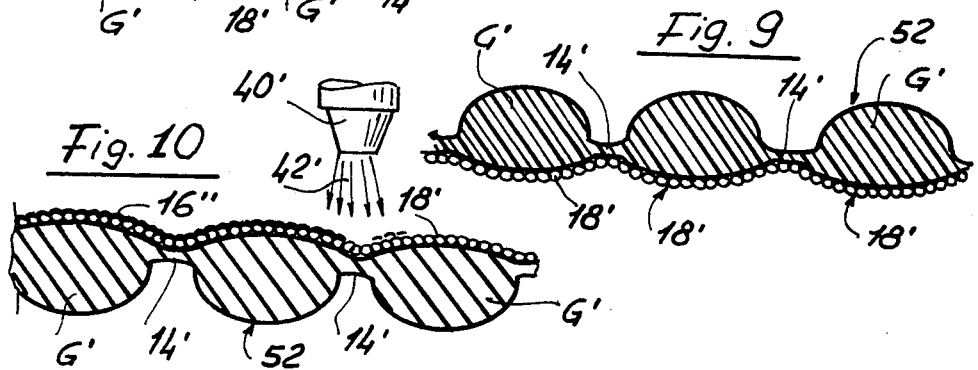

RETRO-REFLECTING ASSEMBLY

BACKGROUND OF THE INVENTION a. The Field of the Invention

The invention is concerned with the art of retro-reflectors for providing nighttime visibility to traffic markings, more particularly but not exclusively to markings laid or formed on road surfaces, such as traffic lane dividing lines, as well as other either vertically or horizontally located signs and markings.

More particularly, this invention is concerned with retro-reflecting assemblies comprising a transparent main globular body more conventionally spheroidal (such main body will be hereinbelow and in the appended claims termed "globule", for simplicity sake, irrespectively of its actual geometry), having an uncoated first surface portion positioned for light impingement, and a plurality of light beams focusing and reflective means, generally a monolayer of transparent microspheres externally coated by a metallic reflective coating, at a second surface portion opposite to said first uncoated portion, for focusing and reflecting light rays which have passed through and been refracted within said globule, so that the impinging light will be reflected outside the globule through said first uncoated surface portion along a path essentially coinciding with that of its impingement on said uncoated portion.

b. The Prior art

This art is a well known and well worked one, and a wide patent literature is available thereon. An analysis about the structure and the optics of retro-reflecting assemblies of the kind referred to above and including each a spherical glass globule has been set forth in the British Patent Specification No. 1,343,196 of same Applicant. An advantageous method for forming a monolayer of microspheres on the surface of the globule and thus providing the assembly has been at its turn set forth in the British Patent Specification No. 1,415,792 also of same Applicant. A plurality of different structures including transparent and not vitreous globules have been proposed and described for example in a further Applicant's British Patent Specification No. 1,443,618. From the above and other available prior publications other details, such as the materials, the dimensions of the assemblies and of their components, the indexes of refraction and so on, have been taught and, therefore, any further discussion about this art is believed to be not necessary.

It is therefore an object of this invention to provide a new and advantageous method for the manufacture of retro-reflecting systems of the type referred to above, in particular of the globules thereof. Another onject of this invention is to take advantage of such new method for the manufacture of transparent globules having a new geometry and adapted for the manufacture retro-reflecting assemblies or systems of surprisingly high optical efficiency, long service life-time under severe traffic wear and other advantages which will become apparent as this description proceeds. A further object of this invention is to provide a method for the manufacture of said highly efficient assemblies and systems, and including steps for assembling same in economical and highly productive manner. A still other object of this invention is to provide a highly efficient retro-reflecting assembly which is characterized by a new combination and arrangement of a particular asymmetrical transparent globule and of a particularly arranged monolayer of focalizing and reflective microspheres.

BRIEF SUMMARY OF THE INVENTION

According to the invention, a plurality of transparent globules is produced by the steps of forcedly passing a sheet of transparent thermoplastic polymeric material between two adjacent counter-rotating calendering cylinders having die-forming recesses evenly and closedly arranged on their cylindrical surfaces to produce upon the action of heat and pressure, an intermediate essentially planar article comprising pluralities of bulges oppositely located at either faces of a plane defined by thin and easily breakable sheet portions which interconnect the globules formed by each pair of oppositely located bulges, of then obtaining the desired individual globules by separating by breaking or otherwise cutting the said intermediate article at said interconnecting thin sheet portions into individual bulged parts, each comprising one pair of said oppositely located bulges, and of processing the said essentially planar intermediate article or the said bulged parts obtained therefrom for providing at least a part of the surface thereof with a monolayer of focalizing and reflective microspheres.

These and other important objects and features of the invention will be now made apparent from the following detailed description of preferred embodiments of same invention, taken together with the accompanying drawings, wherein:

THE VIEWS OF THE DRAWINGS

FIG. 1 is a diagrammatical fragmentary vertical sectional view of the forming device by means of which an intermediate article adapted for producing essentially spherical globules is provided upon the action of heat and pressure;

FIG. 2 fragmentarily, diagrammatically and perspectively illustrates said article and how individual unfinished globules can be obtained therefrom;

FIG. 5 illustrates a modified embodiment of the forming device of FIG. 1, designed for forming an intermediate article adapted for producing asymmetrical globules;

FIG. 6 is an enlarged cross-sectional view of a part of the article produced by the device of FIG. 5;

FIGS. 7 to 10 are views corresponding to that of FIG. 6 and illustrate in rather diagrammatical manner a number of steps preparatory for producing improved asymmetrical retro-reflecting assemblies or aggregates;

FIG. 12, is inclosed in the dot-and-dash contour indicated at -III- in said FIG. 12.

DETAILED DESCRIPTION OF THE PREFERRED EMBODIMENTS

Figure 1:
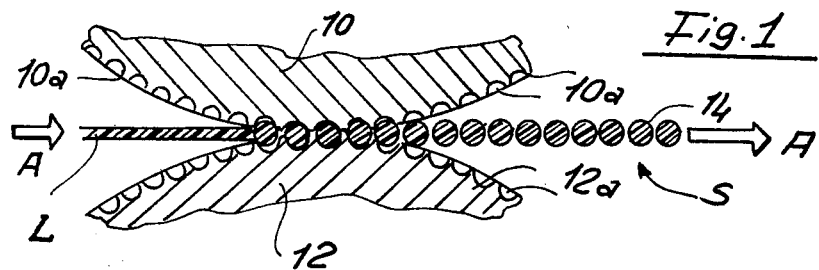

Referring firstly to FIG. 1, a thermoplastic polymeric sheet material L is progessed in direction A in the bite of a pair of counter-rotating calendering cylinders or rollers 10 and 12 the cylindrical surface of which is provided with recesses 10a and respectively 12a. Said rollers 10 and 12 are connected to suitable motor means (not shown) and geared to each other, by suitable gearing means (not shown) so that during the counter-rotation of said rollers each recess 10a will exactly face a recess 12a, and viceversa. The forming of the sheet material L is promoted by the combined action of heat and of pressure.

In view of the desired manufacture of the globules for retro-reflective assemblies, the said sheet material L consists of a transparent polymeric material having a refractive index preferably comprised from 1.45 to 1.68 about. This material preferably consists of polymethylmetacrylate, or of a copolymer of methylstyrene and methylmetacrylate, or of a copolymer of styrene and acrylonitrile, or of a polycarbonate, or also of an epoxy copolymer.

The calendering and forming step diagrammatically shown in FIG. 1 yields the essentially planar intermediate product generally indicated at S. Preferably the sheet material L is heated at a suitable temperature, such as comprised from 200° C to 270° C, while the calendering and forming rollers 10 and 12 are cooled (by known means, not shown, for instance by circulating water therethrough) for maintaining their surface at a temperature comprised from 30° C to 40° C about, so that the intermediate product S is issued in its solid state.

Said intermediate product S has the shape of a very thin sheet 14 at both face of which are arranged pairs of oppositely located bulges the configuration of which is complemental to that of the recesses 10a and 12a. In view of the manufacture of spherical globules, generally indicated at G, said rollers 10 and 12 are provided with recesses of hemi-spherical configuration.

Figure 2:
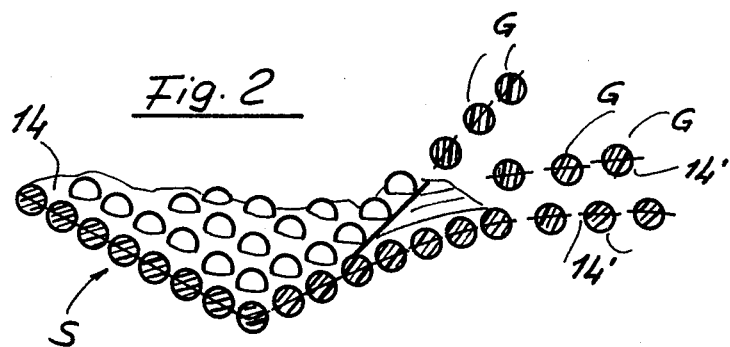

Said intermediate product S generally looks as diagrammatically shown in the left hand part of FIG. 2, that is it appears as formed by a plurality of closely and evenly arranged spheres coplanarly intersected at their greatest or equatorial cross-sectional plane by a thin sheet 14 covering the interspaces between said spheres. By breaking such sheet, such as by exerting a sharp bending or a shearing action localized at said interspaces, the intermediate product S will be therefore subdivided into individual globules G, which are not perfect because small parts 14' of the said thin sheet 14 are still connected to and jut from the globules.

Figure 3:
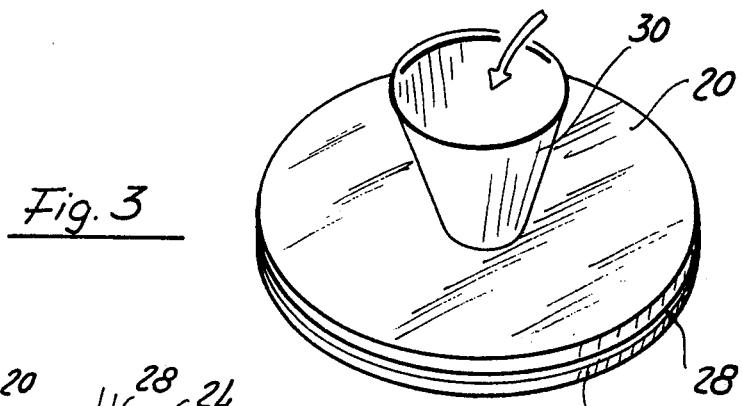
FIG. 3 is a diagrammatical perspective view of a device for finishing said globules and providing perfectly spherical globules.
Figure 4:
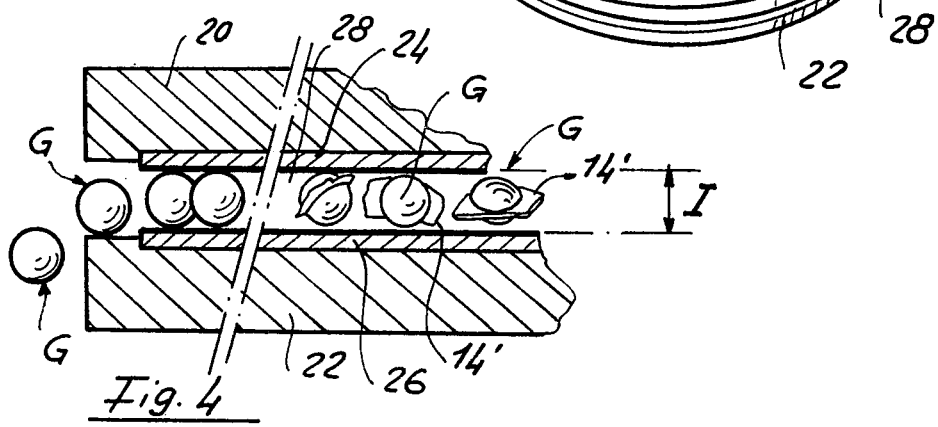
FIG. 4 illustrates a detail of the device of FIG. 3, in greater scale.

Said jutting parts 14' can be removed from the globules in any suitable manner, for instance tumbling barrel. Preferably this step is performed in and by an apparatus such as diagrammatically illustrated in FIGS. 3 and 4. Said apparatus comprises two superimposed coaxial disks 20 and 22 counter-rotated by suitable motor means (not shown) having planar opposite faces spaced by an intercal I (FIG. 4) slightly greater than the diameter of the globules G to be produced, said faces being coated by a suitable abrasive coatings 24 and 26, respectively, made of or lined by emery cloth, for example.

The still not perfect globules are fed into the center of the space 28 of height I, between the disks 20 and 22, by means of a suitable hopper 30 (FIG. 3) and caused to variously roll between the abrasive surfaces while progressing towards the periphery of said space 28, upon the counter-rotation of said disks (one of which might well be stationary). Such action completely removes the jutting parts 14' of the right hand portion of FIG. 4 and the apparatus provides the perfectly spherical globules as illustrated in the left hand part of same FIG. 4.

Said spherical globules G can be processed for providing same with a monolayer of focalizing microspheres, by applying known procedures. For example, the procedure described in the British Patent Specification No. 1,415,792 can be applied.

By taking advantage of the steps described above with reference to FIG. 1, it is evident that globules of geometry different from the spherical one and symmetrical or not about the plane defined by the breakable sheet 14 can be provided. The configuration of the bulging parts at either faces of the thin sheet 14 is complemental to that of the forming recesses of the calendering and forming rollers. Therefore globules of different geometrical characteristics can be produced upon the provision of suitable complemental rollers.

From the above advantageous feature of the invention further and important features are derived. FIG. 5 illustrates a modified embodiment of the means and of the step of FIG. 1. The modified means comprise counter-rotating forming cylinders 10' and 12' provided with rather shallow recesses 10b and respectively essentially hemi-spherical recesses 12b. By processing as above described the sheet material L an intermediate product S' is obtained, which, in its longitudinal vertical cross-sectional planes passing through its bulges, is configurated as best shown in FIG. 6, that is it comprises not yet separed globules G' having one essentially flat even if slightly convex face 50 and an opposite nearly hemispherical face 52, the globules being interconnected by the thin breakable portions 14' of the sheet 14 which, in this occurrence, is not a mid-height of the intermediate product S', but at the level of the horizontal cross-section of the globules, of greatest area and diameter.

The such obtained asymmetrical globules are adapted either for producing very advantageous and optically efficient retro-reflecting assemblies (such as described below with reference to FIGS. 11 to 13) and for providing said globules with the monolayer of microspheres at the sole location where such monolayer is necessary (that is at the second surface portion opposed to the first uncoated surface portion designed for light impingement). Additionally, the said asymmetrical intermediate product S' is adapted for the manufacture of the desired retro-reflecting assembly by means of an advantageous sequence od steps, as described below with reference to FIGS. 7 to 10, which can be performed as a continuous production.

In the asymmetrical globules G' obtained by breaking the parts 14' of the intermediate product of FIGS. 5 and 6 the essentially hemi-spherical surface portion 52 is designed to form the uncoated surface portion of the retro-reflecting assembly and the opposite nearly flat surface portion 50 is designed to be selectively coated by the monolayer of microspheres. The structure of said intermediate product S' is adapted for readily providing said selective arrangement of the monolayer.

The uninterrupted surface formed by the adjacent surfaces 50 and their connecting parts 14' is firstly coated by a thin layer 16' (FIG. 7) of a transparent polymeric binder, such as a polyurethane resin having an index of reflection comprised from 1.13 and 1.39. The thickness of said layer 16', formed say by means of a spray nozzle 40 issusing a metered jet 42 of the liquid or viscous binder, is to be selected with relation to the diameter of the microspheres to be applied, for example not more than 20% of such diameter, so that the microspheres which contact such layer 16' will be bound to the underlying globule G' but their opposite surface portions, far from said layer, will not be even marginally soiled by the binder.

As shown in FIG. 8, a plurality of microspheres 18, preferably of nearly uniform diameter from 10 to 50 microns, and proportional to the diameter of the globules G' at the level of connecting parts 14', the diameter of the microspheres being from 1:30 to 1:200 that of the globules, is poured by means for example a hopper 44, on the upper face of the intermediate product S', in an amount enough and preferably in excess to that required for uninterruptly covering the coating formed by the layer 16' of the binder, so that an essentially homogeneous monolayer 18' of microspheres 18 is formed. Said microspheres 18 are preferably made of a glass having an index of refraction from 1.60 to 2.15.

The excess microspheres 18" which can rest upon the monolayer 18' ensure the forming of said monolayer with microspheres well close to each other. On the other hand, such excess microspheres 18" are not of prejudice because they do not stick on the said monolayer, the outer surface of which being not soiled with the binder. Upon substantial setting of the binder layer, which form an optival transition between the globule and the microspheres of the monolayer 18', said excess microspheres 18" can be readily removed say by a brush, or a blast of pressurized air, or simply by turning upside down the material as being processed, as shown in FIG. 9.

The securing of the monolayer 18' of microspheres can be advantageously complemented by applying, upon removal of said excess microspheres, another very thin layer 16" of transparent binder, by means of another spraying device 40' emitting a suitably metered jet 42' of liquid or semi-liquid resinous binder, such as polyurethane, this step being diagrammatically illustrated in FIG. 10.

The retro-reflecting assemblies require, for being completed, a reflective coating over and about the microsphere layer 18. Such coating can be advantageous made by spray metalization and preferably by vacuum metalization. Such step can be performed by processing the individual assemblies as obtained by breaking the connecting parts 14', and by applying the known art of reflectorization of retro-reflecting assemblies of current type. The metalization of the coated surface portions of the assemblies can also be performed on the intermediate product of the left hand portion of FIG. 10, by applying, in this occurrence, the known art of surface metalizing of sheet material. This last step is obviously followed by the breaking of the parts 14' for providing the individual assembly. This last indicated procedure can be advantageously omitted when planar pieces and strips including a plurality of globules are desired, for example for forming brilliantly reflective alphanumeric signs or other markings.

The above described method for producing transparent globules of practically any desired configuration, such as the asymmetrical configuration shown in FIG. 6, provides an exceedingly advantageous approach for solving the problem of providing improved retro-reflecting of very high efficiency, such as the new and improved assembly now described with reference to FIGS. 11, 12 and 13.

It is evident that a most important factor which governs the attainment of a high optical efficiency comprises the fact that the impinging light rays, such as the rays I', I" and I'" indicated in FIG. 12, which have impinged on the exposed advantageously nearly part-spherical surface portion of the assembly globule G', will go out from said globule at a location below plane L'—L' (the plane which defines the average level at which the assembly is supposed to be embedded in the marking surface) for reaching a focalizing and reflective microsphere and being retro-reflected, will go out by crossing the globule-transparent binder interface at an angle as near as possible to 90°, for minimizing internal reflection. Another still more important factor comprises the fact that any light beam, such as the beam indicated at F in FIG. 13, which can reach a and focalize into a microsphere 18, will be the most large relatively to the microsphere and will focalize at a location P squarely opposed to the area of the globule surface, through which the beam goes out. Such favourable facts are diagrammatically indicated in FIG. 13.

Now, the various light rays which are refracted into a nearly spherical globule, or a globule having an essentially part-spherical uncoated area portion exposed for light impingement, such the surface portion 52, cannot be caused to refractively converge in one location of the opposite surface portion. Now, the improvement consist of making the globule of such geometry that essentially any impinging beam of light will go out from the globule at a location where a plane tangent to the coated convex surface of the globule, at same location, form an angle near to 90°, and where said going out beams will squarely face the oppositely located microsphere.

Figure 11:
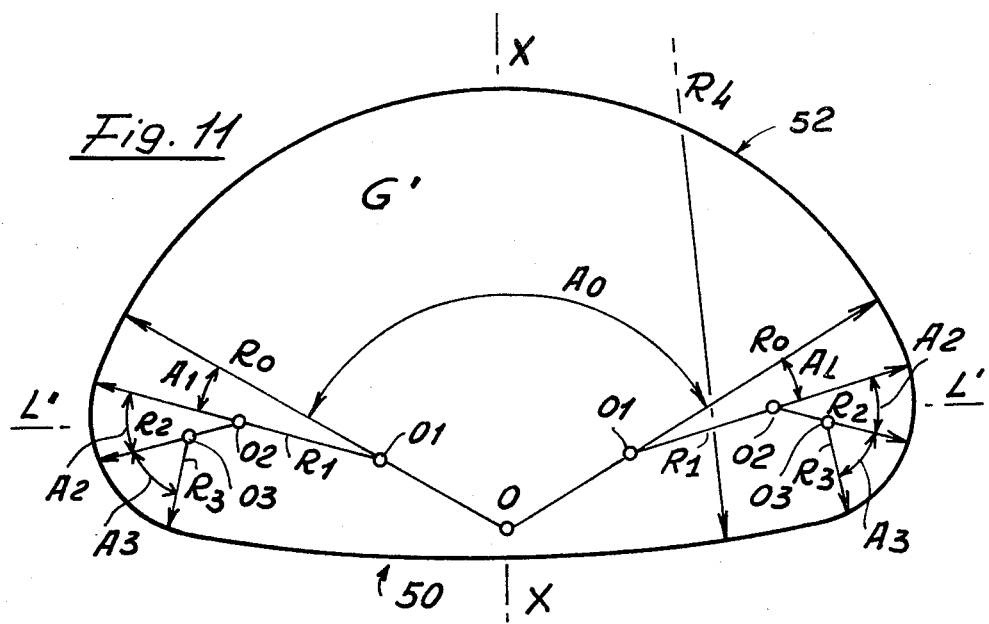
FIG. 11 illustrates in greatly enlarges scale and in detail a preferred geometrical configuration of a vertical cross-section of the improved globule.

A preferred geometry for the globule G' is shown in FIG. 11, where the contour of at least a vertical sectional plane of the globule, parallel to and preferably containing its vertical axis X—X is drawn in enlarged scale. Said preferred geometry comprises an upper arc portion having its center O in said axis X—X and at a level below said plane L'—L', and extended for spanning over the most part of the upper uncoated surface area 52 of the globule, to form the part-spherical surface exposed to light impingement, and a lower nearly straight portion (preferably slightly convex) to form most of the lower opposite area portion coated by the microsphere monolayer, and a peripheral toroidal portion joined to said upper and lower portions and spanning the area where the light which impinges on the said upper surface area 52 goes out from the globule G' in the said angular relationship for squarely reaching the facing microsphere.

The most preferred geometry of said sectional configuration can approximate the polycentric contour illustrated in FIG. 11, where the various centers, radii and angular amplitudes are indicated by reference letters "O" and respectively "R" and "A", followed by numeric indexes; the preferred geometrical relationships are indicated in the following Tables I and II, to be considered together with said FIG. 11:

TABLE I

| Preferred Ratios | Acceptable Ranges |
|---|---|
| $R_1 = \frac{2}{3} R_0$ | $R_1$ equal to or less than $\frac{3}{4} R_0$ |

TABLE I-continued

| Preferred Ratios | Acceptable Ranges |
| --- | --- |
| $R_2 = \frac{1}{3} R_0$ | $R_2$ equal to or less than $\frac{2}{3} R_1$ |
| $R_3 = \frac{2}{3} R_2 = \frac{2}{9} R_0$ | $R_3$ equal to or less than $\frac{2}{3} R_2$ |
| $R_4 = 3 R_0$ about | $R_4$ equal to or greater than $2 R_0$ |

TABLE II

| | |
| --- | --- |
| $A_0$ ... from 90° | ... to 150° |
| $A_1$ ... from 10° | ... to 20° |
| $A_2$ ... from 20° | ... to 40° |
| $A_3$ ... from 40° | ... to 80° |

It is evident that the said geometry does not require that the various radii are constant over the entire indicated angular amplitudes, but that such radii can well progressively vary from the one to the other values of the adjacent arcs to provide a curved close contour of progressively variable curvature, approximating the above described polycentric curve.

Figure 12:
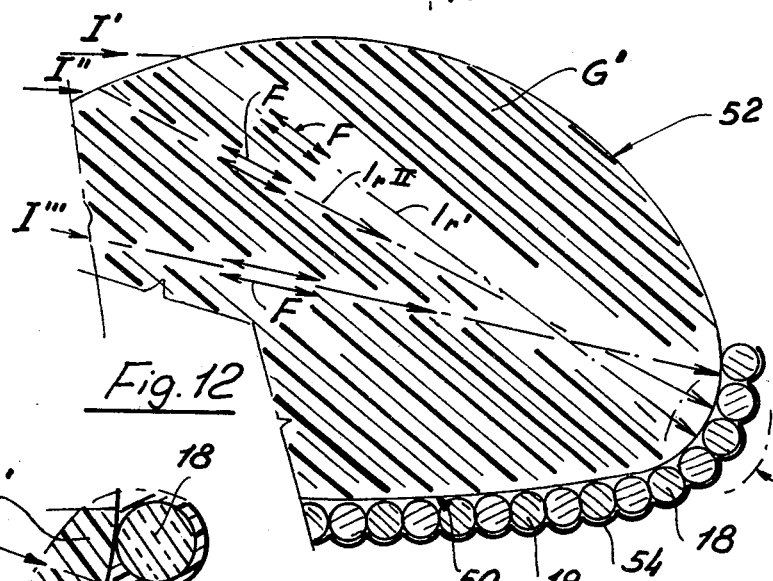
FIG. 12 is a fragmentary sectional view which illustrates, in the enlarged scale of FIG. 11, the improved retro-reflecting assembly comprising the asymmetrical globule of same FIG. 11.
Figure 13:
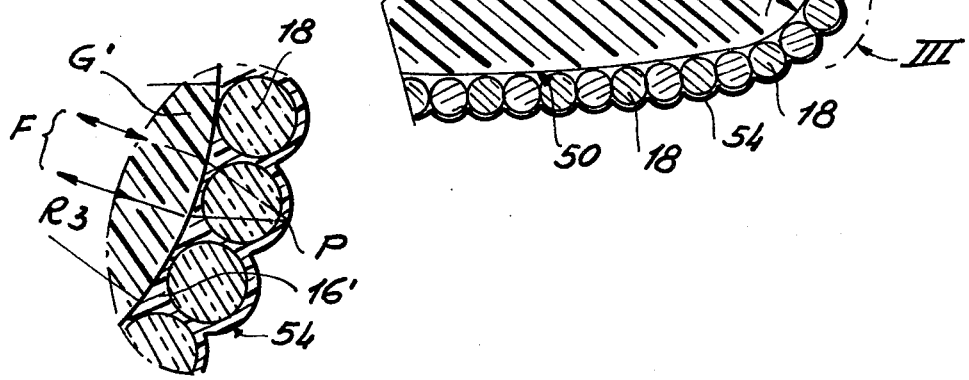
FIG. 13 is a sectional view, in further enlarged scale, of a detail of the assembly if

A retro-reflecting assembly of the type illustrated in FIG. 12 is designed to be applied on the road surface, more particularly on and partially into the upper layer portion of a known prefabricated marking strip material, and embedded thereinto down to a level corresponding about to that indicated at L'—L'. This level corresponds to that of the connecting parts 14' of FIGS. 6 to 10 and which can simply be broken. The small portions which remain attached to the adjacent globules can be left unremoved (no finishing operation is therefore wanted) and improve the well planar location on the road surface and the binding to the painted or prefabricated marking material.

Any progressive wear of the bulging upper surface portion 52, provided that it remains polished and transparent, leading the bulge to somewhat flatten and become elliptical, does not noticeably effect the high optical efficiency of the assembly, the alteration of the profile of the upper exposed portion leading to a somewhat downward deviation of the impinging rays as downwardly refracted within the globule, the lower arc portion of the peripheral toroidal part of radii $R_2$ and $R_3$ being calculated for taking into account said downward deviation resulting from an even substantial wear of the uncoated upper bulge 52.

I claim:

1. An improved retro-reflecting assembly comprising a transparent globule having a first uncoated part-spherical surface portion positioned to be impinged by light rays, a second substantially flat surface portion opposite said first surface portion and a toroidal surface portion intermediate said first and said second surface portions and having a generatrix of radii of curvatures considerably smaller than that of said first part spherical surface portion; and a monolayer of externally reflecting transparent microspheres for focussing and retro-reflecting light beams which impinge on said first surface portion and which have passed through and being reflected by said globule, said monolayer being applied to said second substantially flat surface portion and to at least part of said toroidal surface portion.

2. An improved retro-reflecting assembly as defined in claim 1, wherein the generatrix of said toroidal surface portion is defined by arcs having radii of curvature which are at most a third of that of the generatrix of said spherical surface portion.

3. An improved retro-reflecting assembly as defined in claim 1, wherein said second surface portion is convexly curved at a radius of curvature which is considerably greater than that of said uncoated part-spherical first surface portion.

4. A retroreflecting element comprising:
   a transparent solid globule having a surface subdivided into a first generally part-spherical part, a second generally flat part, and a third annular and outwardly convex part between said first and second parts, said first part being uncoated and having a predetermined relatively large radius of curvature, said third part having at least one radius of curvature substantially smaller than said large radius; and
   a monolayer of externally reflective transparent microspheres covering all of said third part and at least a portion of said second part, said microspheres each being only fractionally as large as said globule.

5. The element defined in claim 4 wherein said radius of curvature of said third part is at most equal to one-third said large radius of said first part.

6. The element defined in claim 4 wherein said second part has at least one radius of curvature considerably greater than said large radius of said first part.

* * * * *